(12) United States Patent
Akahori

(10) Patent No.: US 8,870,435 B2
(45) Date of Patent: Oct. 28, 2014

(54) LIGHT GUIDE

(71) Applicant: Konica Minolta, Inc., Chiyoda-ku (JP)

(72) Inventor: Yuichi Akahori, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/929,113

(22) Filed: Jun. 27, 2013

(65) Prior Publication Data

US 2014/0009967 A1    Jan. 9, 2014

(30) Foreign Application Priority Data

Jul. 3, 2012  (JP) ................................ 2012-149498

(51) Int. Cl.
*F21V 8/00* (2006.01)
(52) U.S. Cl.
CPC ............ *G02B 6/0011* (2013.01); *G02B 6/0013* (2013.01); *G02B 6/002* (2013.01)
USPC .......................................... 362/621; 362/558
(58) Field of Classification Search
CPC .............................. G02B 6/0013; G02B 6/002
USPC .................... 362/621, 602, 558, 551
See application file for complete search history.

(56) References Cited

U.S. PATENT DOCUMENTS

| | | | | |
|---|---|---|---|---|
| 7,163,331 B2 * | 1/2007 | Suzuki et al. | ................. | 362/610 |
| 8,469,571 B2 * | 6/2013 | Yang et al. | .................... | 362/581 |
| 2001/0015892 A1 | 8/2001 | Fujimoto et al. | | |
| 2005/0088705 A1 | 4/2005 | Okamoto et al. | | |
| 2007/0263383 A1 * | 11/2007 | Ansems et al. | ................ | 362/231 |
| 2008/0062686 A1 * | 3/2008 | Hoelen et al. | .................. | 362/240 |
| 2010/0246158 A1 * | 9/2010 | Van Gorkom et al. | ........... | 362/19 |
| 2012/0287668 A1 * | 11/2012 | Richardson et al. | ........... | 362/602 |

FOREIGN PATENT DOCUMENTS

| | | |
|---|---|---|
| JP | 2001-238048 A | 8/2001 |
| JP | 2005-123675 A | 5/2005 |

* cited by examiner

*Primary Examiner* — Laura Tso

(74) *Attorney, Agent, or Firm* — Buchanan Ingersoll & Rooney PC

(57) ABSTRACT

A light guide comprising: a main light-guide housing that is elongated shaped, having a first end face, a second end face, and a first lateral face connecting the first end face and the second end face, and the main light-guide housing being elongated in a predetermined direction from the first end face to the second end face; and a protrusion that is connected to the main light-guide housing, having a third end face in an opposite direction from the predetermined direction and a second lateral face connecting the third end face to the first end face, and the protrusion projecting from the first end face in the opposite direction from the predetermined direction, wherein, light emitted toward the third end face by a light source in part exits the protrusion from the second lateral face, then enters the main light-guide housing from the first end face, and thereafter exits the light guide from the first lateral face.

12 Claims, 6 Drawing Sheets

LIGHT GUIDE

This application is based on Japanese Patent Application No. 2012-149498 filed on Jul. 3, 2012, the content of which is incorporated herein by reference.

BACKGROUND OF THE INVENTION

1. Field of the Invention

The present invention relates to light guides, more particularly to a light guide for use in an image reading apparatus.

2. Description of Related Art

For example, a light source device 500 shown in FIG. 8 is a known light source device including a conventional light guide. FIG. 8 is a cross-sectional structure diagram of the light source device 500 including a conventional light guide 502.

The light source device 500 includes the light guide 502, a light source 504, and a reflective member 506, as shown in FIG. 8. The light guide 502 is made of transparent resin, and extends in a left-right direction in FIG. 8. The light guide 502 has a prism that reflects light upwardly inside the light guide 502, formed on its bottom surface. The light source 504 is directed to the left end of the light guide 502. Moreover, the reflective member 506 surrounds the gap between the light guide 502 and the light source 504.

In the light source device 500 thus configured, light emitted by the light source 504 enters the light guide 502 from the left end. At this time, light that propagates from the gap between the light guide 502 and the light source 504 toward the outside of the light source device 500 is reflected by the reflective member 506, and enters the light guide 502 from the left end. The light having entered the light guide 502 travels rightward while repeatedly experiencing total reflection within the light guide 502, and then the light is reflected upwardly by the prism formed in the light guide 502. Since the light source device 500 is provided with the reflective member 506, light is inhibited from leaking out of the light source device 500 through the gap between the light guide 502 and the light source 504.

Incidentally, the light source device 500 uses the reflective member 506 to inhibit leakage of light. When reflecting light, the reflective member 506 absorbs part of the light. Therefore, the light source device 500 cannot efficiently utilize light emitted by the light source 504.

Note that, for example, illumination optics described in Japanese Patent Laid-Open Publication No. 2005-123675 are a known invention related to a conventional light guide. The illumination optics confine light inside a light guiding means through total reflection without using a reflective member. However, in the illumination optics described in Japanese Patent Laid-Open Publication No. 2005-123675, light does not enter the light guiding means from an end in a longitudinal direction but from the bottom surface of the light guiding means. Therefore, Japanese Patent Laid-Open Publication No. 2005-123675 does not describe efficiently utilizing light emitted by a light source in a light guide in which light enters from an end in a longitudinal direction.

SUMMARY OF THE INVENTION

In an embodiment of the present invention, a light guide comprising: a main light-guide housing that is elongated shaped, having a first end face, a second end face, and a first lateral face connecting the first end face and the second end face, and the main light-guide housing being elongated in a predetermined direction from the first end face to the second end face; and a protrusion that is connected to the main light-guide housing, having a third end face in an opposite direction from the predetermined direction and a second lateral face connecting the third end face to the first end face, and the protrusion projecting from the first end face in the opposite direction from the predetermined direction, wherein, light emitted toward the third end face by a light source in part exits the protrusion from the second lateral face, then enters the main light-guide housing from the first end face, and thereafter exits the light guide from the first lateral face.

DETAILED DESCRIPTION OF THE PREFERRED EMBODIMENTS

Hereinafter, an image reading apparatus including a light guide according to an embodiment of the present invention will be described.

Configuration of Image Reading Apparatus

Figure 1:
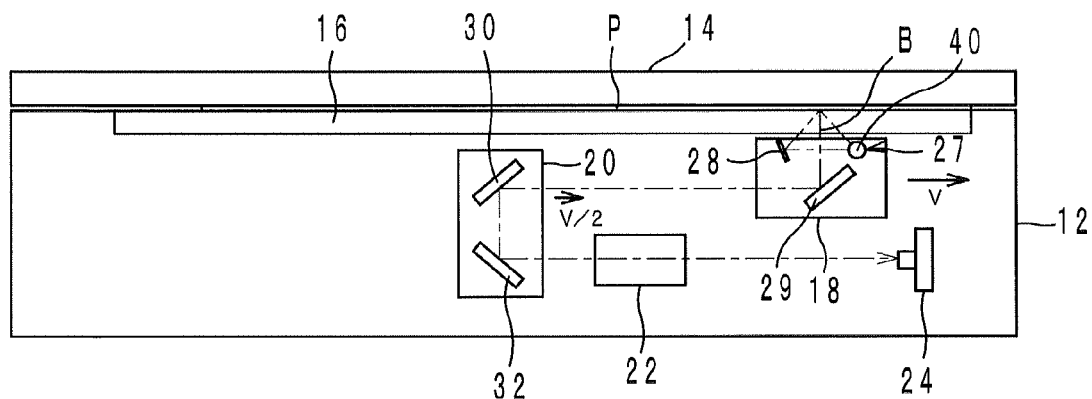
FIG. 1 is a configuration diagram of an image reading apparatus including a light guide according to an embodiment of the present invention.
Figure 1:
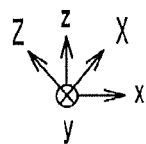

FIG. 1 is a configuration diagram of an image reading apparatus 10 including a light guide according to an embodiment of the present invention. In the following, the vertical direction will be defined as z-axis, and the moving direction of slider units 18 and 20 (i.e., a sub-scanning direction) will be defined as x-axis. Moreover, the direction that is perpendicular to the x- and z-axes (i.e., a main scanning direction) will be defined as y-axis.

The image reading apparatus 10 includes a main housing 12, a document cover 14, a platen glass 16, the slider units 18 and 20, an imaging lens 22, and an image pickup element 24, as shown in FIG. 1.

The main housing 12 is a rectangular casing in which the document cover 14, the platen glass 16, the slider units 18 and 20, the imaging lens 22, and the image pickup element 24 are provided. The platen glass 16 is a rectangular, transparent plate attached to an opening provided in the main housing 12 in the positive z-axis direction. A document P is placed on the top surface of the platen glass 16, with the face to be read being directed to the negative z-axis direction.

The document cover 14 is placed over the document P, thereby causing the document P to closely contact the platen glass 16, as shown in FIG. 1.

When the document P is being read, the slider unit 18 is moved at a velocity V along the document P in the positive x-axis direction by unillustrated transportation means, including a motor, a belt, a pulley, etc., as shown in FIG. 1. The slider unit 18 includes a light source device 27, and mirrors 28 and 29, as shown in FIG. 1.

The light source device 27 is configured by, for example, a combination of a light-emitting diode (LED) and a light guide, so as to emit light toward the document P and the mirror 28. The light source device 27 will be described in more detail later. The mirror 28 reflects the light emitted by the light source device 27, toward the document P. The mirror 29 redirects light B reflected by the document P, in the negative x-axis direction (toward one side of the sliding direction of the slider unit 18), as shown in FIG. 1.

When the document P is being read, the slider unit 20 is moved at a velocity V/2 along the document P in the positive x-axis direction by unillustrated transportation means, including a motor, a belt, a pulley, etc., as shown in FIG. 1. The slider unit 20 includes mirrors 30 and 32.

The mirror 30 reflects the light B redirected by the mirror 29, in the negative z-axis direction. The mirror 32 redirects the light B reflected by the mirror 30, in the positive x-axis direction.

The imaging lens 22 forms an optical image on the image pickup element 24 on the basis of the light B. The image pickup element 24 is a light receiving element that receives light B reflected by the mirror 32. Specifically, the image pickup element 24 is a line sensor, such as a CCD camera, which has a linear imaging zone extending in the y-axis direction and reads an image of the document P by scanning the optical image formed by the imaging lens 22.

Configuration of Light Source Device

Figure 2:
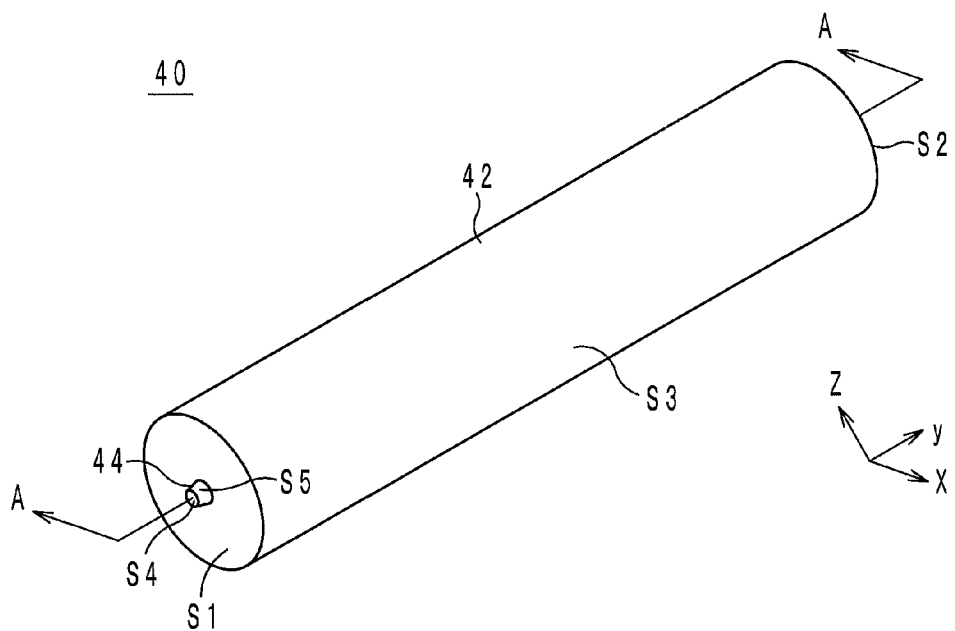
FIG. 2 is an oblique external view of a light guide of a light source device.
Figure 3:
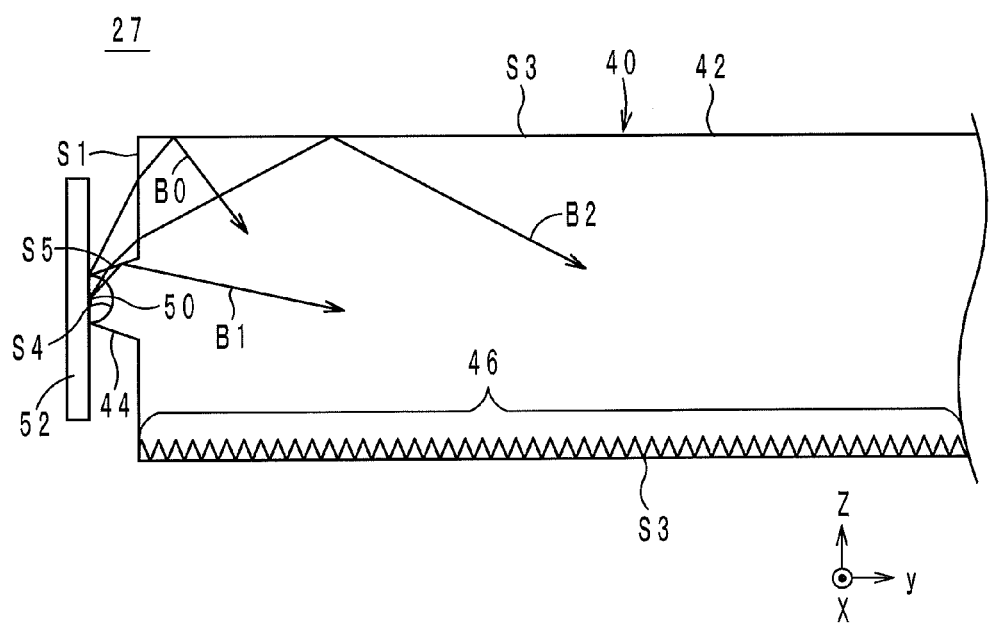
FIG. 3 is a cross-sectional structure diagram of the light source device taken along line A-A in FIG. 2.

The configuration of the light source device 27 will be described below with reference to the drawings. FIG. 2 is an oblique external view of the light guide 40 of the light source device 27. FIG. 3 is a cross-sectional structure diagram of the light source device 27 taken along line A-A in FIG. 2. The x- and z-axes rotated approximately 45 degrees counterclockwise about the y-axis in FIG. 3 will be referred to below as the X- and Z-axes, respectively. The Z-axis coincides with the direction in which the light source device 27 emits light toward the document P.

The light source device 27 includes the light guide 40, a light source 50, and a circuit board 52, as shown in FIGS. 2 and 3.

The light guide 40 includes a main light-guide housing 42 and a protrusion 44, and has an elongated shape in the y-axis direction, as shown in FIGS. 2 and 3. The main light-guide housing 42 is a transparent columnar member having end faces S1 and S2 and a lateral face S3. The end face S1 is a circular surface located at an end of the main light-guide housing 42 in the negative y-axis direction. The end face S2 is a circular surface located at an end of the main light-guide housing 42 in the positive y-axis direction. The lateral face S3 is a round surface connecting the end faces S1 and S2. In this manner, the main light-guide housing 42 extends in the direction from the end face S1 to the end face S2 (i.e., in the positive y-axis direction).

Furthermore, the light guide 40 has a reflective portion 46, as shown in FIG. 3. The reflective portion 46 is provided at a portion of the lateral face S3 in the negative Z-axis direction, and consists of a plurality of prisms arranged in the y-axis direction. Each prism has a triangular shape in a plan view in the X-axis direction. As a result, the reflective portion 46 reflects light from the inside of the main light-guide housing 42 toward the outside. In the present embodiment, the reflective portion 46 reflects light in the positive Z-axis direction toward the document P, and also in the negative x-axis direction toward the mirror 28. Note that the reflective portion 46 is not limited to the prisms, and may be a white resin surface for diffuse reflection.

The protrusion 44 is connected to the main light-guide housing 42, and projects in the negative y-axis direction from the center of the end face S1. The cross section of the protrusion 44 in the direction perpendicular to the y-axis increases in the positive y-axis direction. In the present embodiment, the protrusion 44 has a truncated cone shape, the diameter of which increases in the positive y-axis direction. Moreover, the central axis of the protrusion 44 coincides with the central axis of the main light-guide housing 42.

Furthermore, the protrusion 44 has an end face S4 and a lateral face S5, as shown in FIGS. 2 and 3. The end face S4 is a surface located at an end of the protrusion 44 in the negative y-axis direction. The lateral face S5 is a lateral surface connecting the end face S4 of the protrusion 44 and the end face S1 of the main light-guide housing 42. The end face S4 is a curved surface, which is recessed in the positive y-axis direction, as shown in FIG. 3. In the present embodiment, the end face S4 is a spherical concave.

The circuit board 52 is a flat rectangular board provided with a driver circuit for driving the light source 50. The circuit board 52 is disposed facing the end face S4 of the protrusion 44, so as to be perpendicular to the y-axis. Note that, in addition to a board with the light source 50, another board with the driver circuit may be provided outside the light guide 40 and connected to the board with the light source 50 via a cable.

The light source 50 is, for example, an LED, and is mounted on a principal surface of the circuit board 52 in the positive y-axis direction. The light source 50 is accommodated in the recess formed by the end face S4, as shown in FIG. 3. The light source 50 has a light-emitting surface positioned at the center of the spherical concave of the end face S4. Furthermore, the recess formed by the end face S4 is filled with transparent resin. Note that there may be an air space in the recess in place of the transparent resin. The light source 50 emits light in the positive y-axis direction, the positive and negative Z-axis directions, and the positive and negative X-axis directions. That is, the light source 50 emits light over a 180-degree angular range about the y-axis. The light emitted by the light source 50 enters the protrusion 44 from the end face S4, as shown in FIG. 3.

An optical path of the light source device 27 will be described in detail below with reference to FIG. 3.

The light source 50 emits light over a 180-degree angular range about the y-axis. Light B1 enters the lateral face S5 at an angle equal to or greater than a critical angle between the air space and the light guide 40, and then enters the main light-guide housing 42 after it is reflected by the lateral face S5, as shown in FIG. 3. Subsequently, the light B1 reaches the reflective portion 46 after repeatedly experiencing total reflection by the lateral face S3 within the main light-guide housing 42. Then, the light B1 is reflected by the reflective portion 46 in the positive Z-axis direction or in the negative x-axis direction, and exits the light guide 40. Note that part of the light B1 exits the light guide 40 after it is directly reflected by the reflective portion 46 without experiencing total reflection by the lateral face S3.

Furthermore, light B2 enters the lateral face S5 at an angle less than the critical angle between the air space and the light guide 40, and exits the protrusion 44 from the lateral face S5. The protrusion 44 has a truncated cone shape that increases in thickness in the positive y-axis direction. Therefore, the light B2 is refracted by the lateral face S5, so that the propagation direction of the light B2 leans toward the positive y-axis direction. Then, the light B2 enters the main light-guide housing 42 from the end face S1. Subsequently, the light B2 reaches the reflective portion 46 after repeatedly experiencing total reflection by the lateral face S3 within the main light-guide housing 42. Then, the light B2 is reflected by the reflective portion 46 in the positive Z-axis direction or in the negative x-axis direction, and exits the light guide 40. Note that part of the light B2 exits the light guide 40 after it is directly reflected by the reflective portion 46 without experiencing total reflection by the lateral face S3.

Furthermore, light B0, which propagates in a direction at the largest angle with respect to the positive y-axis direction among the light emitted by the light source 50, exits the protrusion 44 from the lateral face S5. In the present embodiment, the light B0 is light emitted by the light source 50 in a direction perpendicular to the y-axis (i.e., in the Z-axis direction). Since the protrusion 44 has a truncated cone shape that increases in thickness in the positive y-axis direction, the light B0 is refracted by the lateral face S5, so that the propagation direction of the light B0 leans toward the positive y-axis direction. As a result, the light B0 propagates to the end face S1, and enters the main light-guide housing 42 from the end face S1. Subsequently, the light B0 reaches the reflective portion 46 after repeatedly experiencing total reflection by the lateral face S3 within the main light-guide housing 42. Then, the light B0 is reflected by the reflective portion 46 in the positive Z-axis direction or in the negative x-axis direction, and exits the light guide 40. Note that part of the light B0 exits the light guide 40 after it is directly reflected by the reflective portion 46 without experiencing total reflection by the lateral face S3.

Here, the light B0 is incident on the lateral face S3 in the positive Z-axis direction, preferably at an angle equal to or greater than the critical angle between the air space and the light guide 40. As a result, the light B0 experiences total reflection by the lateral face S3, so that all of the light emitted by the light source 50 so as to be incident on the lateral face S3 in the positive Z-axis direction experiences total reflection by the lateral face S3.

Effects

The light guide 40 according to the present embodiment can utilize light emitted by the light source 50 more efficiently than the light source device 500 using a conventional reflective member. More specifically, the light source 50 is attached to the end face S4 of the protrusion 44. Therefore, light emitted by the light source 50 enters the protrusion 44. Then, the light having entered the protrusion 44 is guided into the main light-guide housing 42 through total reflection by the lateral face S5 of the protrusion 44, as with the light B1, or through refraction by the lateral face S5 and the end face S1, as with the light B0 and B2. In this manner, the light emitted by the light source 50 is guided into the main light-guide housing 42 through total reflection, or through refraction, without being reflected by the reflective member. Optical loss caused by total reflection or refraction is lower than optical loss caused from reflection by the reflective member. Thus, the light guide 40 makes it possible to efficiently utilize light emitted by the light source 50.

Furthermore, also for the following reason, the light guide 40 can efficiently utilize light emitted by the light source 50. More specifically, the light B0, which propagates in a direction at the largest angle with respect to the positive y-axis direction among the light emitted by the light source 50, exits the protrusion 44 from the lateral face S5, and thereafter enters the main light-guide housing 42 from the end face S1. As a result, all of the light emitted by the light source 50 enters the main light-guide housing 42. That is, leakage of light is inhibited between the light source 50 and the main light-guide housing 42. Thus, the light guide 40 makes it possible to efficiently utilize light emitted by the light source 50.

Furthermore, also for the following reason, the light guide 40 can efficiently utilize light emitted by the light source 50. More specifically, the light B0 is incident on the lateral face S3 in the positive Z-axis direction, preferably at an angle equal to or greater than the critical angle between the air space and the light guide 40. Accordingly, the light B0 experiences total reflection by the lateral face S3. As a result, all of the light emitted by the light source 50 so as to be incident on the lateral face S3 in the positive Z-axis direction experiences total reflection by the lateral face S3, so that the light is inhibited from exiting the main light-guide housing 42 without experiencing total reflection by the lateral face S3. Thus, the light guide 40 makes it possible to efficiently utilize light emitted by the light source 50.

Furthermore, also for the following reason, the light guide 40 can efficiently utilize light emitted by the light source 50. More specifically, light emitted by the light source 50 enters the protrusion 44, and is guided into the main light-guide housing 42 through refraction or total reflection. Accordingly, more light can reach the reflective portion 46. As a result, there is an increase in the amount of light that is reflected toward the document P and the mirror 28 by the reflective portion 46. On the other hand, there is a decrease in the amount of light that leaves the light guide 40 from the end face S2 without being reflected by the reflective portion 46. Thus, the light guide 40 makes it possible to efficiently utilize light emitted by the light source 50.

Furthermore, the main light-guide housing 42 of the light guide 40 can be reduced in dimension in the Z-axis direction. More specifically, the protrusion 44 has a truncated cone shape, the diameter of which increases in the positive y-axis direction. Accordingly, the lateral face S5 is inclined with respect to the y-axis. As a result, the light B0 and the light B2, which are to exit the protrusion 44, are refracted by the lateral face S5 so as to lean in the positive y-axis direction. Therefore, light that exits the protrusion 44 is inhibited from diffusing in the Z-axis direction. Thus, it is rendered possible to use the main light-guide housing 42 with a reduced dimension in the Z-axis direction.

First Modification

Figure 4:
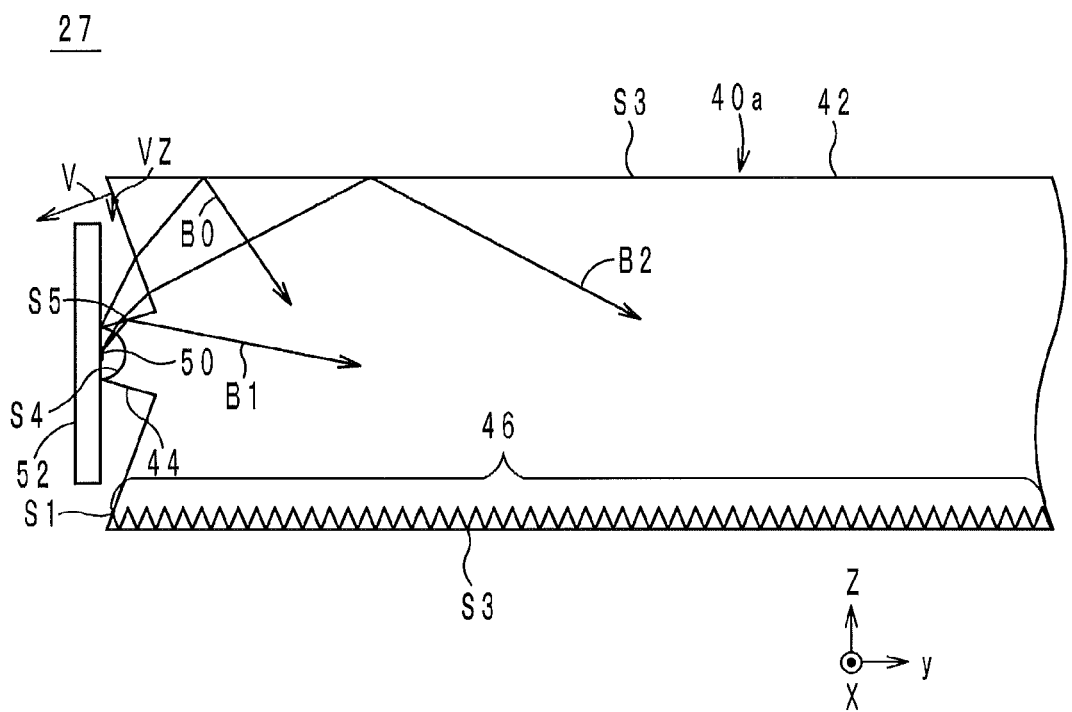
FIG. 4 is a cross-sectional structure diagram of a light source device including a light guide according to a first modification.

A light guide 40a according to a first modification will be described below with reference to the drawings. FIG. 4 is a cross-sectional structure diagram of a light source device 27 including the light guide 40a according to the first modification.

The light guide 40a differs from the light guide 40 in shape of the end face S1. More specifically, the end face S1 of the light guide 40 is a flat surface perpendicular to the y-axis, as shown in FIG. 3. On the other hand, the end face S1 of the light guide 40a is inclined toward the protrusion 44, as shown in FIG. 4. More specifically, the Z-axis component VZ of the normal vector V to the end face S1 is entirely directed toward the protrusion 44 (i.e., the center of the end face S1). Moreover, the end face S1 is linear in y-Z cross section. As a result, the light B0 and the light B2 enter the end face S1 more readily in the light guide 40a than in the light guide 40. Thus, the light guide 40a can utilize light emitted by the light source 50 more efficiently than the light guide 40. Moreover, the light B0 and the light B2 enter the end face S1 at closer positions from the center of the end face S1 in the light guide 40a than in the light guide 40. Thus, the dimension of the main light-guide housing 42 in the Z-axis direction can be reduced in the light guide 40a more than in the light guide 40.

Furthermore, the end face S1 of the light guide 40a is inclined toward the protrusion 44, as shown in FIG. 4. As a result, the light B0 and the light B2 are incident on the lateral face S3 in the positive Z-axis direction at smaller angles of incident in the light guide 40a than in the light guide 40. Therefore, the light B0 and the light B2 can be reflected toward the reflective portion 46 more readily in the light guide 40a than in the light guide 40. Thus, there is an increase in the amount of light that is reflected toward the document P and the mirror 28 by the reflective portion 46.

Second Modification

Figure 5:
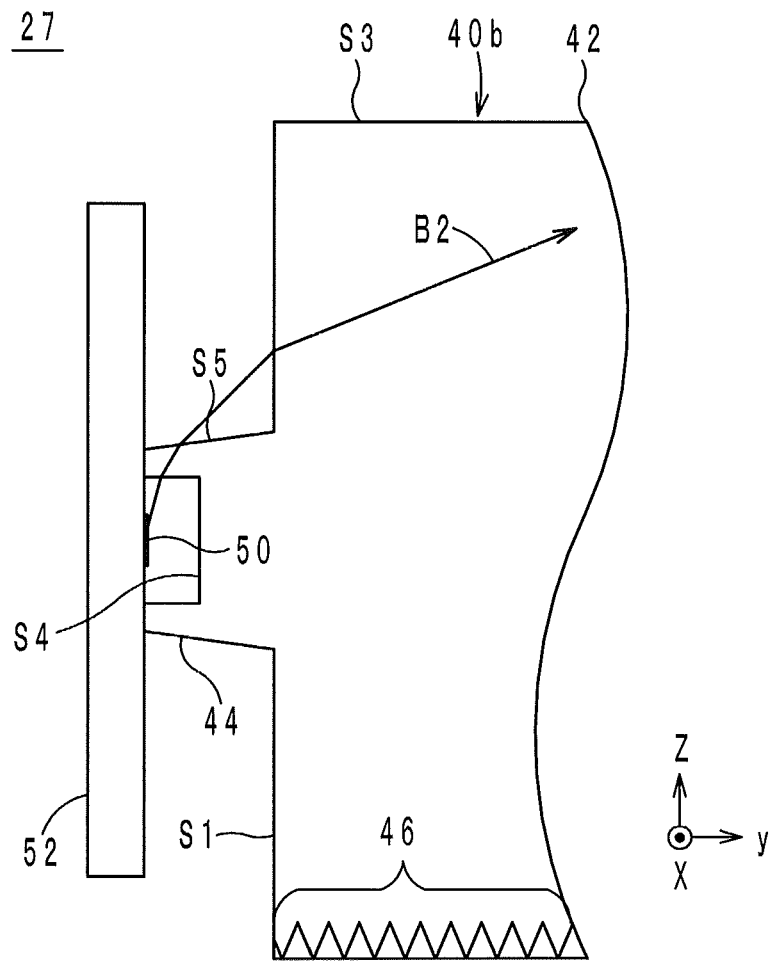
FIG. 5 is a cross-sectional structure diagram of a light source device including a light guide according to a second modification.

A light guide 40b according to a second modification will be described below with reference to the drawings. FIG. 5 is a cross-sectional structure diagram of a light source device 27 including the light guide 40b according to the second modification.

The light guide 40b differs from the light guide 40 in shape of the recess formed by the end face S4. More specifically, the end face S4 of the light guide 40 forms a spherically concave recess. On the other hand, the end face S4 of the light guide 40b forms a rectangular parallele piped recess. Accordingly, the end face S4 has a flat surface. As a result, the light B2 is refracted by passing through the end face S4, as shown in FIG. 5. Thus, by adjusting the refractive index of the resin to fill the recess formed by the end face S4 or the shape of the recess, the propagation direction of the light B2 can be changed. For example, the refractive index of the resin to fill the recess is set higher than the refractive index of the light guide 40, so that the light B2 is refracted so as to lean in the positive y-axis direction. As a result, the light B2 enters the end face S1 more readily in the light guide 40b than in the light guide 40. Thus, the light guide 40b makes it possible to utilize light emitted by the light source 50 more efficiently than the light guide 40. Moreover, the light B2 enters the end face S1 at a closer position from the center of the end face S1 in the light guide 40b than in the light guide 40. Thus, the dimension of the main light-guide housing 42 in the Z-axis direction can be reduced in the light guide 40b more than in the light guide 40.

Third Modification

Figure 6:
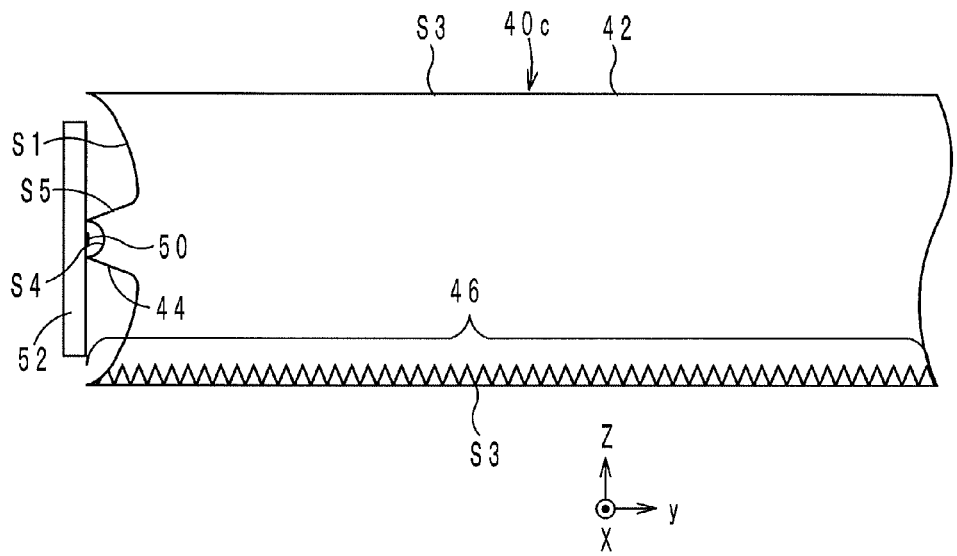
FIG. 6 is a cross-sectional structure diagram of a light source device including a light guide according to a third modification.

A light guide 40c according to a third modification will be described below with reference to the drawings. FIG. 6 is a cross-sectional structure diagram of a light source device 27 including the light guide 40c according to the third modification.

The light guide 40c differs from the light guide 40a in shape of the end face S1. More specifically, the end face S1 of the light guide 40a is linear in y-Z cross section. On the other hand, the end face S1 of the light guide 40c is curvilinear in y-Z cross section. Such a light guide 40c also makes it possible to efficiently utilize light emitted by the light source 50.

Fourth Modification

Figure 7:
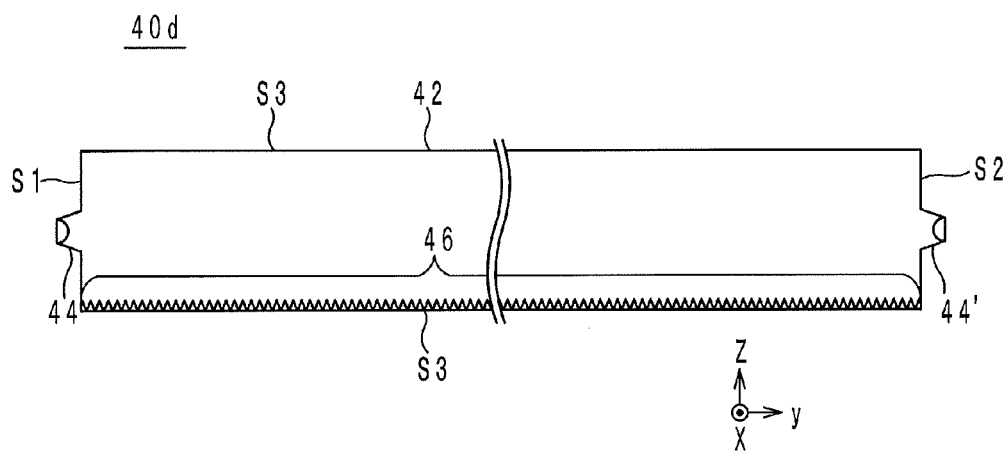
FIG. 7 is a cross-sectional structure diagram of a light guide according to a fourth modification.
Figure 8:
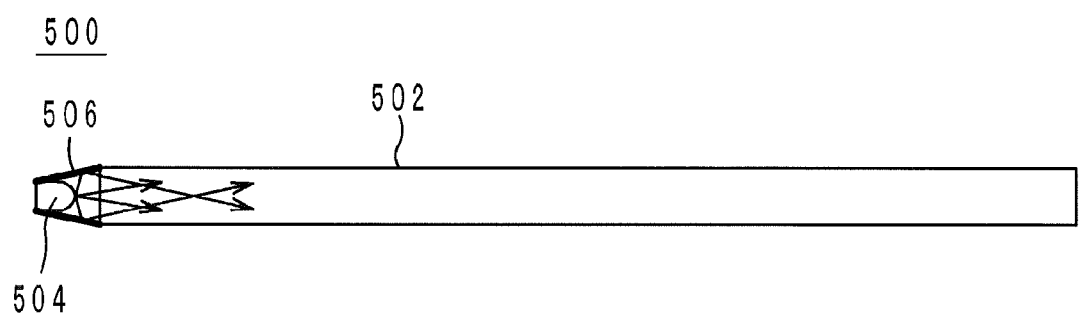
FIG. 8 is a cross-sectional structure diagram of a light source device including a conventional light guide.

A light guide 40d according to a fourth modification will be described below with reference to the drawings. FIG. 7 is a cross-sectional structure diagram of the light guide 40d according to the fourth modification.

The light guide 40d differs from the light guide 40 in that it further includes a protrusion 44'. The protrusion 44' is provided to the end face S2, as shown in FIG. 7. Thus, light can enter the light guide 40d from either side in the y-axis direction. Such a light guide 40d also makes it possible to efficiently utilize light emitted by the light source 50.

Other Embodiments

The present invention is not limited to the light guides 40 and 40a to 40d, and variations can be made within the spirit of the invention.

Note that, for the light guides 40 and 40a to 40d, the light B0, which propagates in a direction at the largest angle with respect to the positive y-axis direction among the light emitted by the light source 50, exits the protrusion 44 from the lateral face S5, and enters the main light-guide housing 42 from the end face S1. However, this is not restrictive. The light emitted by the light source 50 at least in part exits the protrusion 44 from the lateral face S5, and enters the main light-guide housing 42 from the end face S1. That is, for the light guides 40 and 40a to 40d, the light that has exited the protrusion 44 from the lateral face S5 enters the main light-guide housing 42 from the end face S1. This makes it possible to efficiently utilize light having exited the lateral face S5.

Note that the light source 50 emits light over a 180-degree angular range about the y-axis, but the light source 50 may emit light over an angular range of less than 180 degrees.

Although the present invention has been described in connection with the preferred embodiment above, it is to be noted that various changes and modifications are possible to those who are skilled in the art. Such changes and modifications are to be understood as being within the scope of the invention.

What is claimed is:

1. A light guide comprising:
   a main light-guide housing that is elongated shaped, having a first end face, a second end face, and a first lateral face connecting the first end face and the second end face, and the main light-guide housing being elongated in a predetermined direction from the first end face to the second end face; and
   a protrusion that is connected to the main light-guide housing, having a third end face in an opposite direction from the predetermined direction and a second lateral face connecting the third end face to the first end face, and the protrusion projecting from the first end face in the opposite direction from the predetermined direction, wherein,
   light emitted toward the third end face by a light source in part exits the protrusion from the second lateral face, then enters the main light-guide housing from the first end face, and thereafter exits the light guide from the first lateral face.

2. The light guide according to claim 1, wherein the protrusion increases in its cross section perpendicular to the predetermined direction, in the predetermined direction.

3. The light guide according to claim 2, wherein the protrusion has a truncated cone shape whose diameter increases in the predetermined direction.

4. The light guide according to claim 1, wherein a component of a normal vector to the first end face in a direction perpendicular to the predetermined direction is entirely directed toward the protrusion.

5. The light guide according to claim 1, wherein the third end face forms a recess in which the light source is accommodated.

6. The light guide according to claim 5, wherein the light emitted by the light source enters the protrusion from the third end face.

7. The light guide according to claim 6, wherein the third end face is a curved surface.

8. The light guide according to claim 7, wherein,
the third end face is a spherical concave, and
the light source is positioned at the center of the spherical concave.

9. The light guide according to claim 6, wherein the third end face is a flat surface.

10. The light guide according to claim 1, wherein light that propagates in a direction at the largest angle with respect to the predetermined direction among the light emitted by the light source exits the protrusion from the second lateral face, and thereafter enters the main light-guide housing from the first end face.

11. The light guide according to claim 10, wherein the light that propagates in a direction at the largest angle with respect to the predetermined direction among the light emitted by the light source enters the first lateral face at an angle equal to or greater than a critical angle.

12. The light guide according to claim 1, wherein the main light-guide housing has a reflective portion that is provided on the first lateral face and is adapted to reflect light from the inside of the main light-guide housing toward the outside.

\* \* \* \* \*